Patented Jan. 14, 1947

2,414,211

UNITED STATES PATENT OFFICE 2,414,211

METHOD OF PREPARING DIMETHYLUREA

Jacob Rosin, David Josephowitz, and Samuel Josephowitz, New York, N. Y.

No Drawing. Application April 12, 1945, Serial No. 588,070

1 Claim. (Cl. 260—553)

Our invention relates generally to dimethylurea, and in particular it relates to a new and improved method of preparing such product. Dimethylurea, the formula of which is

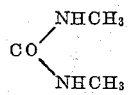

is used in the synthesis of purine compounds as theophylline, caffeine, etc. Phosgene and methylamin are conventionally used in the commercial preparation of dimethylurea, but since these materials are relatively expensive, and the phosgene is highly poisonous, these conventional processes are costly and dangerous. The presently known methods of producing theophylline and caffeine are very expensive, and particularly so as far as the caffeine is concerned, the cost of the natural product being relatively low.

With our new method, and using materials never before used for such purpose, we are enabled to produce dimethylurea very cheaply and without any danger as attends the use of phosgene.

The main object of our invention, therefore, is the provision of a new and improved method of producing dimethylurea.

Another object of our invention is the provision of a method of producing dimethylurea by the use of dimethylolurea.

Another object of our invention is the provision of a method whereby dimethylolurea is reduced to dimethylurea.

Another object of our invention is the provision of a method of treating dimethylolurea which comprises guarding same to prevent decomposition and resinification thereof, and reducing the same to dimethylurea.

Other and further objects of our invention will, in part, be obvious, while still others will be specifically pointed out in the following specification.

Our starting material, dimethylolurea, the formula of which is:

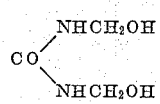

is relatively unstable, being easily decomposable by heat. It easily resinifies by low pH and high temperatures, so that these conditions must be guarded against in our treatment of dimethylolurea. We protect our starting material in various ways in order to prevent decomposition and resinification, and guide the reaction to follow, generally, the formula:

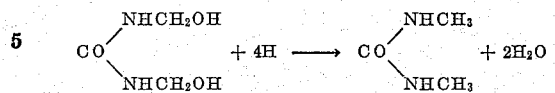

While dimethylolurea precipitates almost immediately as an insoluble precipitate of resinified dimethylolurea in an aqueous solution at a pH of about 3, we have found that a solution of dimethylolurea in concentrated hydrochloric acid is relatively stable even in heat and may be subjected to a reduction with amalgamated zinc to lead to dimethylurea. For example, 50 gr. of mossy zinc, previously amalgamated by a solution of 5 gr. of mercuric chloride (corrosive sublimate) in 75 cc. of water and 3 cc. of concentrated hydrochloric acid, was refluxed for five (5) hours with a solution of 10 gr. of dimethylolurea in 100 cc. of concentrated hydrochloric acid. By the use of the term "concentrated hydrochloric acid" we mean the commercial type generally available of between 35% to 38% HCl and a specific gravity of about 1.18%. When the reaction is concluded, the solution is decanted from undissolved zinc and freed from zinc chloride by precipitating the zinc with sodium carbonate and filtration. The filtrate is then evaporated to dryness, the residue extracted with methanol and the extract evaporated to dryness. The residue, containing raw dimethylurea, can be purified in the usual manner by extraction with hot benzene and recrystallization, or by sublimation in vacuum.

The above procedure is merely exemplary of our new and improved method of obtaining dimethylurea by the reduction of dimethylolurea. The conditions inherent in our process are: strong reduction, while preventing decomposition and resinification, of the starting material dimethylolurea.

Having now described our invention, what we claim and desire to secure by Letters Patent is:

The method of preparing dimethylurea which comprises the reduction of dimethylolurea by the use of amalgamated zinc in commercial concentrated hydrochloric acid solution, thereby preventing decomposition or resinification of the dimethylolurea.

JACOB ROSIN.
DAVID JOSEPHOWITZ.
SAMUEL JOSEPHOWITZ.